United States Patent
Brück et al.

(10) Patent No.: US 6,391,421 B1
(45) Date of Patent: May 21, 2002

(54) EXTRUDED HONEYCOMB BODY, IN PARTICULAR A CATALYTIC CONVERTER CARRIER BODY, WITH REINFORCED WALL STRUCTURE

(75) Inventors: Rolf Brück; Wolfgang Maus, both of Bergisch Gladbach (DE)

(73) Assignee: EMITEC Gesellschaft fur Emissiontechnologie mbH, Lohmar (DE)

( * ) Notice: Subject to any disclaimer, the term of this patent is extended or adjusted under 35 U.S.C. 154(b) by 0 days.

(21) Appl. No.: 09/368,137

(22) Filed: Aug. 4, 1999

Related U.S. Application Data

(63) Continuation of application No. PCT/EP98/00439, filed on Jan. 28, 1998.

(51) Int. Cl.[7] .................................................. B32B 3/12
(52) U.S. Cl. ..................................................... 428/116
(58) Field of Search .......................... 425/116; 428/118

(56) References Cited

U.S. PATENT DOCUMENTS

| | | | |
|---|---|---|---|
| 4,416,676 A | | 11/1983 | Montierth ..................... 55/523 |
| 4,713,361 A | * | 12/1987 | Maus ............................. 502/2 |
| 4,795,615 A | * | 1/1989 | Cyron et al. ................. 422/179 |
| 4,948,353 A | * | 8/1990 | Maus et al. .................. 428/180 |
| 4,953,627 A | * | 9/1990 | Ito et al. |
| 5,045,403 A | * | 9/1991 | Maus et al. .................. 428/593 |
| 5,102,743 A | * | 4/1992 | Maus et al. .................. 428/593 |
| 5,103,641 A | * | 4/1992 | Maus et al. ................... 60/299 |
| 5,130,208 A | * | 7/1992 | Maus et al. .................. 428/593 |
| 5,150,573 A | * | 9/1992 | Maus et al. ................... 60/299 |
| 5,294,411 A | * | 3/1994 | Breuer et al. ................ 422/174 |
| 5,474,746 A | * | 12/1995 | Maus et al. .................. 422/174 |
| 5,585,073 A | * | 12/1996 | Swars et al. ................. 422/174 |
| 5,753,339 A | * | 5/1998 | Hawes |
| 5,865,864 A | * | 2/1999 | Brück .......................... 55/482 |
| 5,866,230 A | * | 2/1999 | Maus ............................ 428/116 |

FOREIGN PATENT DOCUMENTS

| | | |
|---|---|---|
| EP | 0 227 482 A2 | 7/1987 |
| EP | 0 452 125 A2 | 10/1991 |
| EP | 0 867 222 A2 | 9/1998 |

OTHER PUBLICATIONS

International Publication No. WO 94/15712 (Maus), dated Jul. 21, 1994.

* cited by examiner

*Primary Examiner*—Deborah Jones
*Assistant Examiner*—Wendy Boss
(74) *Attorney, Agent, or Firm*—Laurence A. Greenberg; Werner H. Stemer; Gregory L. Mayback

(57) ABSTRACT

An extruded honeycomb body, in particular a catalytic converter carrier body, having a plurality of passages through which a fluid can flow and of which at least a portion is bordered and/or separated from each other with passage walls of a first thickness and at least a portion is bordered and/or separated from each other with passage walls of a second thickness. The first thickness is less than the second thickness and the honeycomb body has a wall structure which stabilizes it and which is formed with passage walls of the second thickness. The stabilizing wall structure has a plurality of approximately straight wall portions of the second thickness which, transversely with respect to the local configuration of the edge of the honeycomb body, extend from a respective outside into the interior of the honeycomb body or extend through the honeycomb body. Honeycomb bodies according to the invention, have good stability, and can have particularly thin passage walls whereby they have at least locally a particularly low thermal capacity.

14 Claims, 3 Drawing Sheets

EXTRUDED HONEYCOMB BODY, IN PARTICULAR A CATALYTIC CONVERTER CARRIER BODY, WITH REINFORCED WALL STRUCTURE

CROSS-REFERENCE TO RELATED APPLICATION

This is a continuation of copending International Application PCT/EP98/00439, filed Jan. 28, 1998, which designated the United States.

BACKGROUND OF THE INVENTION

Field of the Invention

The invention concerns a honeycomb body having a plurality of passages through which a fluid can flow and of which at least a portion is bordered and/or separated from each other with passage walls of a first thickness and at least a portion is bordered and/or separated from each other with passage walls of a second thickness. The first thickness is less than the second thickness and the honeycomb body has a wall structure which stabilizes it and which is formed with passage walls of the second thickness. Honeycomb bodies of this kind are used for example for the catalytic conversion of exhaust gases of an internal combustion engine.

International Patent Application WO 94/15712 discloses an extruded honeycomb body of a ceramic and/or metallic material having a plurality of passages which are separated from each other by partitions and which extend in approximately parallel relationship. The particular configuration of the wall structure increases elasticity in comparison with previously known honeycomb bodies.

Published, Non-Prosecuted Japanese Patent Application JP 54-150406 A describes an extruded honeycomb body in which the passages are separated from each other by wall portions which cross each other approximately perpendicularly. In regard to the cross-section of the honeycomb body, the partitions, within two zones which extend in mutually crossing relationship from a respective outward side of the honeycomb body to an oppositely disposed outward side of the honeycomb body, are of a thickness which is greater than the basic thickness of the partitions. Wall portions with thick partitions extend through the zones diagonally with respect to the direction in which the zones extend so that the wall portions are thick in parts thereof and thin in other parts thereof. In a test for mechanical strength, that honeycomb body was compared to two honeycomb bodies in which the thickness of the partitions in the described zones is equal to the basic thickness of the partitions. The result of the test, which is shown in tabular form in the Japanese Patent Application JP 54-150406 A, clearly shows that the honeycomb body with the thicker partitions in the zones enjoys no advantages whatsoever in terms of mechanical strength in comparison with the other two honeycomb bodies, and even has a lower level of mechanical strength in a direction diagonally with respect to the direction of the wall portions.

In recent years the development of new honeycomb bodies has been along the lines of reducing thermal capacity. With a lower level of thermal capacity it is possible in particular to achieve better cold start performance when using the honeycomb bodies in exhaust gas catalytic converters. The ignition temperature as from which the catalytic procedure begins is achieved earlier. Besides thermal capacity, the pressure drop that occurs in a gas flow through the honeycomb body also plays a part in the development involved. The pressure drop should be as low as possible. Both aims of development, namely a low thermal capacity and a low pressure drop, can be achieved by use of thin passage walls. However the passage walls cannot be made of just any arbitrarily thin dimension as the wall structure otherwise becomes unstable and is damaged under thermal and/or mechanical loadings.

SUMMARY OF THE INVENTION

It is accordingly an object of the invention to provide an extruded honeycomb body, in particular a catalytic converter carrier body, with a reinforced wall structure that overcomes the above-mentioned disadvantages of the prior art devices of this general type, in which the extruded honeycomb body has thin passage walls and a stable wall structure.

With the foregoing and other objects in view there is provided, in accordance with the invention, an extruded honeycomb assembly, including a honeycomb body having an edge, an interior, and an outside periphery, the honeycomb body containing:

first passage walls having a first thickness;

second passage walls having a second thickness thicker than the first thickness, the first passage walls and the second passage walls defining a plurality of passages therebetween through which a fluid can flow, at least a portion of the plurality of passages being at least one of enclosed and separated from each other by the first passage walls, and at least a part of the plurality of passages being one of enclosed and separated from each other by the second passage walls; and a stabilizing wall structure formed of the second passage walls for stabilizing the honeycomb body, the second passage walls of the stabilizing wall structure being a plurality of substantially straight wall portions of the second thickness, the plurality of substantially straight wall portions disposed transversely with respect to the edge of the honeycomb body and one of extending from a respective outside into the interior of the honeycomb body and passing though the honeycomb body, and none of the plurality of passages being enclosed by the second passage walls forming the plurality of substantially straight wall portions.

The honeycomb body according to the invention has passage walls of a first thickness and passage walls of a second thickness, where the first thickness is less than the second thickness. Passage walls of the second thickness form a lattice-like wall structure that stabilizes the honeycomb body. The lattice-like wall structure has a plurality of approximately straight wall portions which, transversely with respect to the local configuration of the honeycomb body edge, extend from a respective outside into the interior of the honeycomb body or pass through the honeycomb body. The term wall portion is used to denote passage walls, which extend into each other, and form a plurality of passages.

In an embodiment of the honeycomb body in accordance with the invention a plurality of the wall portions pass through the interior of the honeycomb body from an outside thereof to an oppositely disposed outside. In that way, particularly in the regions of the edge of the honeycomb body from which the wall portions pass through the interior of the honeycomb body, forces acting on the honeycomb body from the exterior thereof can be carried away without the honeycomb body suffering damage. However even in the case of wall portions of the second thickness, which do not extend through the interior of the honeycomb body, forces acting on the edge of the honeycomb body can be carried away. The wall portions extending into the interior can transmit forces onto a multiplicity of walls of the first thickness which are connected thereto and can thus distribute forces acting from the exterior, in the interior of the honeycomb body.

In a further embodiment of the honeycomb body a plurality of the wall portions of the second thickness extend at least to a common node at which they are connected together and which is disposed in the interior of the honeycomb body. The term node denotes a region in which at least two approximately straight wall portions are fixedly connected together. A node is an elongate connecting region of wall portions, which connecting region extends along a line. There are embodiments of the honeycomb body in which the wall portions that are connected together in the node that extend from an outside to an approximately oppositely disposed outside, embodiments in which (approximately straight) wall portions terminate in the node and embodiments in which all or some of the wall portions connected in the node are extended beyond the node without reaching an oppositely disposed outside.

An advantage of the invention is that honeycomb bodies with thin walls can be built in a stable structure. By virtue thereof it is for example possible to achieve a high cell density, that is to say, a large number of passages per unit area in the cross-section of the honeycomb body, without having to tolerate the disadvantage of a high pressure drop in an exhaust gas flow. A high cell density has an advantageous effect on the catalytic conversion of exhaust gases as a large catalytically operative surface area can be achieved per unit volume of the honeycomb body.

In cold start phases or re-starting phases of an internal combustion engine with an exhaust gas catalytic converter, it is important for the catalytic converter to reach the ignition temperature as quickly as possible. Thin walls permit that to occur, by virtue of their low thermal capacity. The crucial consideration is that the ignition temperature is achieved at an early time, at least locally at the thin walls. There is however no need for the ignition temperature to be achieved approximately at the same time everywhere in the catalytic converter as the chemical reactions which take place after the ignition temperature is attained are exothermic. The zones in which the ignition temperature is reached or exceeded therefore rapidly spread.

The use of honeycomb bodies according to the invention results in early initiation of the catalytic procedure in exhaust gas catalytic converters. With the passage walls of the first and second thicknesses being subjected to an approximately uniform incident flow of hot exhaust gas the catalytic procedure begins at the (thinner) walls of the first thickness and rapidly spreads to the walls of the second thickness. In comparison with honeycomb bodies of the same thermal capacity but only with walls of one thickness, the catalytic procedure of the invention of the instant application begins more quickly. It still begins more quickly however even when the thermal capacity of the honeycomb body according to the invention is greater, as long as there are thinner walls.

An advantage of the honeycomb body according to the invention is that forces which act on the honeycomb body in directions that differ from the directions of the wall portions of the second thickness can also be carried away by way of the stabilizing wall structure. Particularly in the case of honeycomb bodies according to the invention whose stabilizing wall structure has at least four of the wall portions which cross at a node they are resistant to such loadings. In a development of this embodiment the at least four wall portions, in the cross-section of the honeycomb body, include between them approximately equal angles at the node. In the case of honeycomb bodies which have approximately rotationally symmetrical outside surfaces and whose passages extend through substantially parallel to the axis of rotation, the node is preferably disposed approximately on the axis of rotation. In addition there can be further nodes of the wall portions intersecting in the node disposed on the axis of rotation, with other wall portions.

A further advantage of the honeycomb body according to the invention is a favorable vibration characteristic. Due to its stable construction the lattice-like wall structure is insensitive to vibration. In addition however it also reduces the vibration lengths, perpendicularly to the axial length of the honeycomb body, of the wall structure regions with exclusively thinner passage walls. Those vibration lengths can be matched to a given purpose of use of the honeycomb body. Care is to be taken to ensure that no resonance vibrations of the honeycomb structure are induced.

In a development of the honeycomb body according to the invention a larger part of the passage wall surfaces in the interior of the honeycomb body is formed by the passage walls of the first thickness than by the passage walls of the second thickness. The first thickness is preferably at least 20% smaller than the second thickness.

The reference to "a" thickness of a passage wall is used to denote the mean thickness of the passage wall, while the local thickness can vary by some percent of the mean thickness.

In an embodiment of the honeycomb body the first thickness is of a value of between 20 $\mu$m and 60 $\mu$m, and preferably about 30 $\mu$m.

In an advantageous development the honeycomb body has an outside periphery, and in the interior of which is disposed passages. A plurality of wall portions extend there around in a closed configuration, crossing the straight wall portions of the second thickness and are disposed at different, respectively approximately constant spacings relative to the outside periphery of the honeycomb body, so that regions in the form of ring segments are formed in cross-section. In a development at least some of the wall portions extending around the configuration in a closed configuration are of the first thickness. In still another development further passage walls subdivide the ring segment-like regions, wherein the subdividing passage walls extend transversely with respect to the wall portions which extend around the configuration in a closed configuration. In yet a further development the cross-sectional areas of all passages, at least in the ring segment-like regions, are approximately equal.

The object of the present invention is further attained by a honeycomb body having a plurality of passages through which a fluid can flow. At least a portion of the passages is bordered and/or separated from each other with passage walls of a first thickness and at least a portion is bordered and/or separated from each other with passage walls of a second thickness. Moreover the first thickness is less than the second thickness and the honeycomb body has a wall structure for stabilizing it, which is formed with passage walls of the second thickness.

In that honeycomb body the stabilizing wall structure has a plurality of approximately straight wall portions of the second thickness, which extend from a respective location at the edge of the honeycomb body through the interior of the honeycomb body to another location at the edge. Preferably at least two of the wall portions of the second thickness begin and end at such locations at the edge of the honeycomb body.

Other features which are considered as characteristic for the invention are set forth in the appended claims.

Although the invention is illustrated and described herein as embodied in an extruded honeycomb body, in particular a catalytic converter carrier body, with a reinforced wall structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
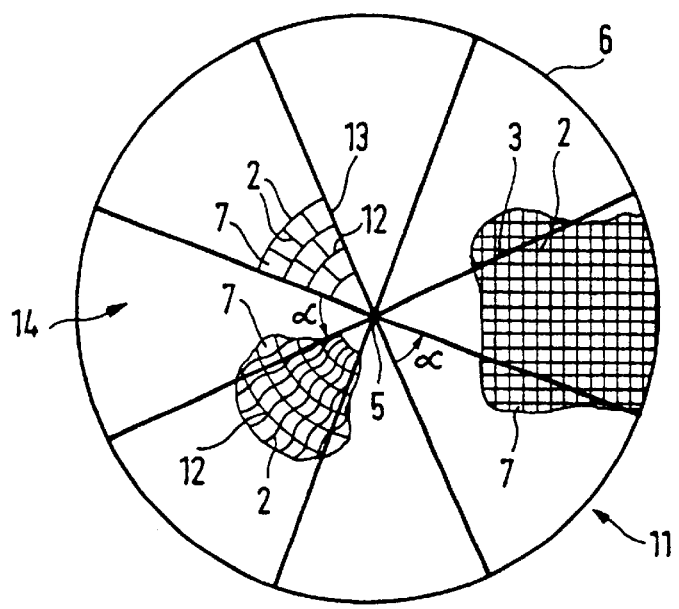
FIG. 1 is a diagrammatic, partially cut-away, front-elevational view of a honeycomb body with a wheel spoke-like stabilizing wall structure.

In all the figures of the drawing, sub-features and integral parts that correspond to one another bear the same reference symbol in each case. Referring now to the figures of the drawing in detail and first, particularly, to FIG. 1 thereof, there is shown a honeycomb body 11 having a circular cross-sectional area. The honeycomb body 11 has a wheel spoke-like wall structure 14 for stabilizing it, with four wall portions 13 of a second thickness, which cross at a node 5. The wall portions 13 pass through an interior of the honeycomb body 11 from a respective outside thereof to an oppositely disposed outside. The node 5 is disposed approximately on an axis of rotation of the honeycomb body 11. Each two adjacent wall portions 13 include between them an angle a at the node 5, the angle α being approximately 45° in each case. The wheel spoke-like wall structure 14 is supplemented by a casing 6 which extends around the configuration at the outside thereof and which imparts additional stability to the wall structure 14. In this case the casing 6 is of approximately the same thickness as the second thickness. There are however also constructions in which the casing 6 is even thicker. FIG. 1 indicates by way of example in three different regions the way in which the overall structure of the passage walls can be configured. Shown in the right-hand part of FIG. 1 is a pattern that is formed by passage walls 2 of a first thickness. There the passages 7 are of approximately square cross-sectional areas. Individual ones of the passages 7 are defined by passage walls 3 of the second thickness, more specifically where the straight wall portions 13 of the second thickness intersect the pattern. The lower left part of FIG. 1 shows wall portions 12 of the first thickness, which extend in a curved configuration and which, crossing the wall portions 13 having the second thickness, are disposed at various, respectively approximately constant spacings relative to the outside periphery of the honeycomb body 11 so that regions of ring segment-like configuration in cross-section are formed between each two wall portions 12 of the first thickness and two straight wall portions 13 of the second thickness. The ring segment-like regions are subdivided by further passage walls 2 of the first thickness. In that configuration, the subdividing passage walls 2 extend in a curved configuration between each two wall portions 12 of the first thickness. The fact that the passage walls 2 do not extend in a radial direction results in the honeycomb body 11 enjoying increased elasticity. For further details of honeycomb bodies with passage walls 2 configured in that way, attention is directed to International Patent Application WO 94/15712. Another structure in respect of the passage walls 2 of the first thickness can be seen in the top left part of FIG. 1. It differs by virtue of the straight passage walls 2 that subdivide the ring segment-like regions. The passages 7 that are formed in that way are all approximately equal in cross-section. There are further embodiments (not shown) of the honeycomb body according to the invention, in which further wall portions of the second thickness are attached to the wall portions 12 of the first thickness which extend in a curved configuration, the further wall portions connecting the wall portions 12 to the edge of the honeycomb body. Those wall portions with the second thickness do not extend between an edge and the node 5.

Figure 2:
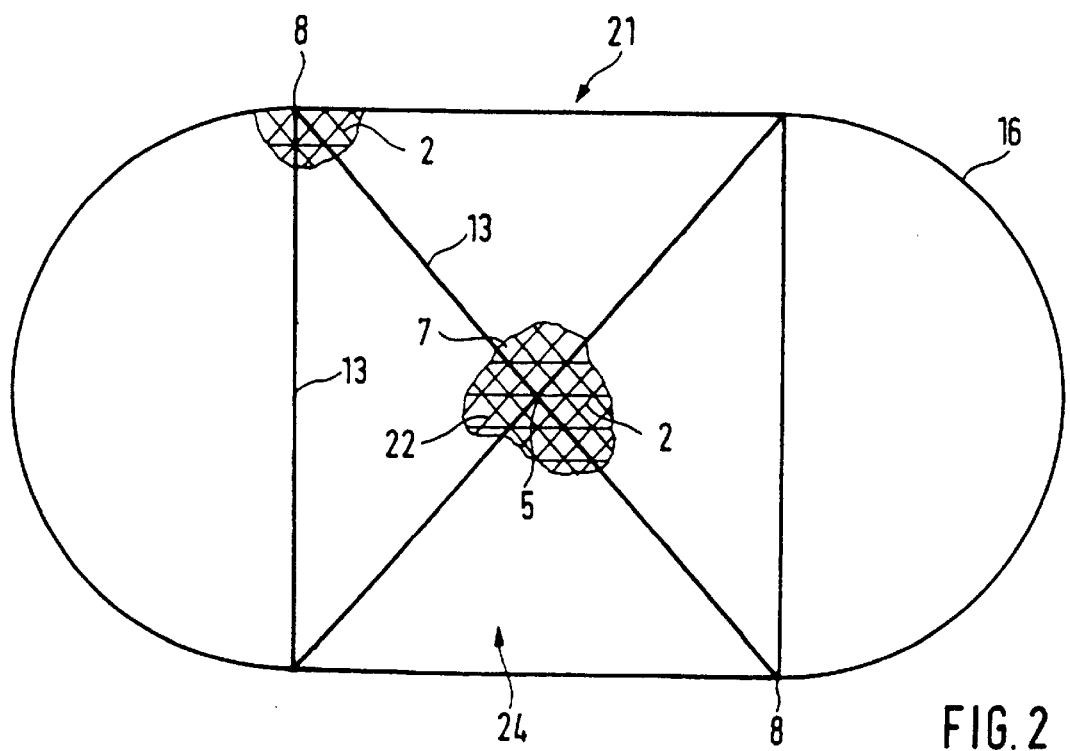
FIG. 2 is a partially cut-away, front-elevational view of the honeycomb body with an oval cross-section.

FIG. 2 shows a honeycomb body 21 with an oval casing 16 that is stabilized by a stabilizing wall structure 24. Of the four wall portions 13 of the second thickness in the interior of the honeycomb body 21, two wall portions 13 cross at the node 5. Two further wall portions 13 additionally support the honeycomb body 21 insofar as they interconnect the two oppositely disposed outsides of the honeycomb body 21 with a flat edge surface. At casing connecting locations 8 each two of the wall portions 13 of the second thickness come together at the oval casing 16.

Figure 3:
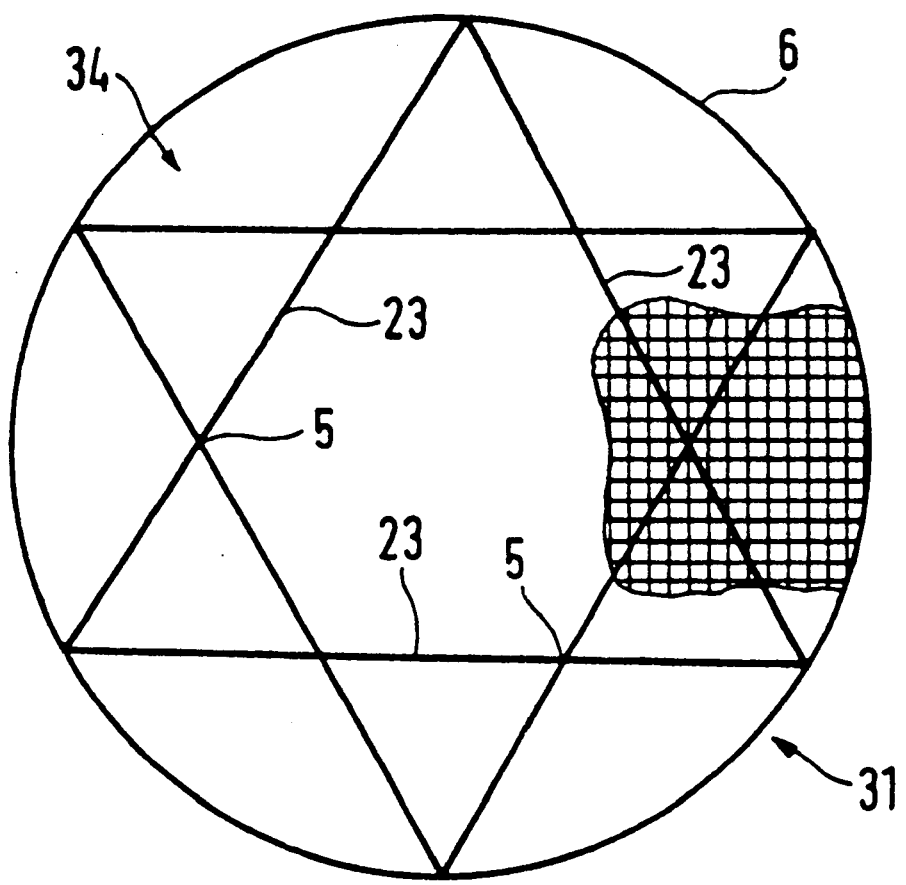
FIG. 3 is a partially cut-away, front-elevational view of the honeycomb body with star-shaped stabilizing wall structure.

FIG. 3 shows a honeycomb body 31 with a star-shaped stabilizing wall structure 34. A total of six straight wall portions 23 pass through the nodes 5. The stabilizing wall structure 34 has a total of six such nodes S.

Figure 4:
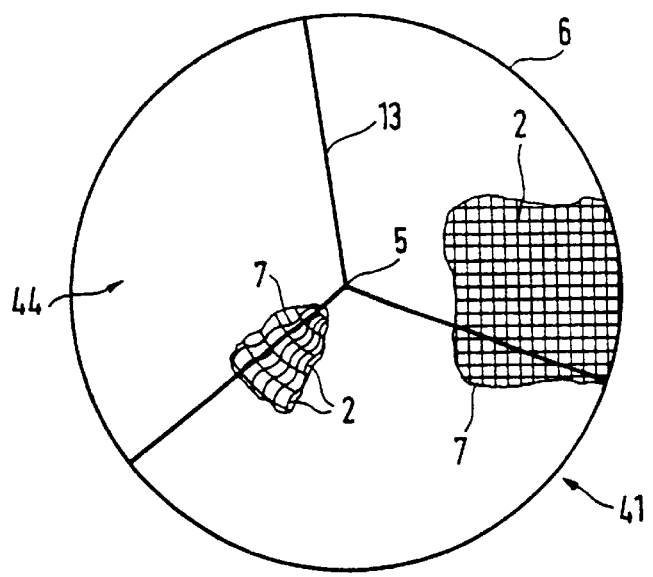
FIG. 4 is a partially cut-away, front-elevational view of the honeycomb body with three wall portions of a second thickness, which are connected at a node.

FIG. 4 shows a further embodiment. Three of the wall portions 13 of the second thickness connect three locations at an edge of a honeycomb body 41 to the node 5. The stabilizing wall structure 44 with the wall portions 13 subdivides the honeycomb body 41 into three equal-sized segments.

Figure 5:
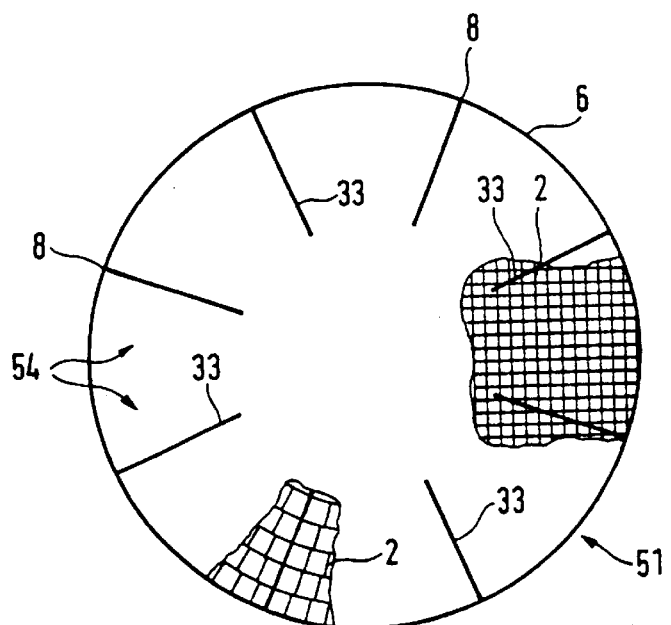
FIG. 5 is a partially cut-away, front-elevational view of the honeycomb body with eight straight wall portions of the second thickness, which do not have any node relative to each other, in cross-section.

FIG. 5 shows a further embodiment. A stabilizing wall structure 54 has eight straight wall portions 33 that reinforce a honeycomb body 51 in particular in its outer region. The wall portions 33 do not have any nodes relative to each other. They are each attached to an edge of the honeycomb body 51 at a respective casing connecting location 8, perpendicularly to the respective tangential plane, and permit forces acting on the honeycomb body 51 approximately perpendicularly to the tangential plane to be carried away into the interior of the honeycomb body. The forces are transmitted to the structure of the passage walls 2 of the first thickness and are distributed in the interior of the honeycomb body 51.

As the examples show, configurations of the honeycomb body according to the invention are of a similar structure to previously known honeycomb bodies. They can be produced using the same processes at the previously known honeycomb bodies. Honeycomb bodies with stabilizing wall structures can therefore be produced at approximately the same cost.

We claim:

1. An extruded honeycomb assembly, comprising:
a honeycomb body extruded in one piece and having an edge, an interior, and an outside periphery, said honeycomb body including:
first passage walls having a first thickness;
second passage walls having a second thickness thicker than said first thickness, said first passage walls and said second passage walls being formed of a same material and defining a plurality of passages therebetween through which a fluid can flow, at least a portion of said plurality of passages being at least one of enclosed and separated from each other by said first passage walls, and at least a part of said plurality of passages being one of enclosed and separated from each other by said second passage walls; and
a stabilizing wall structure formed of said second passage walls for stabilizing said honeycomb body, said second passage walls of said stabilizing wall structure being a plurality of substantially straight wall portions of said second thickness, all of said plurality of substantially straight wall portions disposed perpendicularly to said edge of said honeycomb body and one of extending from a respective outside into said interior of said honeycomb body and passing though said honeycomb body, and none of said plurality of passages being enclosed by said second passage walls forming said plurality of substantially straight wall portions.

2. The honeycomb assembly according to claim 1, wherein said honeycomb body is a catalytic converter carrier body.

3. The honeycomb assembly according to claim 1, wherein said plurality of substantially straight wall portions pass through said interior of the honeycomb body from the respective outside to an oppositely disposed outside.

4. The honeycomb assembly according to claim 1, wherein said plurality of substantially straight wall portions extend into said interior of said honeycomb body at least to a common node at which said plurality of substantially straight wall portions are connected together.

5. The honeycomb assembly according to claim 4, wherein said stabilizing wall structure has at least four of said substantially straight wall portions crossing at said common node.

6. The honeycomb assembly according to claim 5, wherein said at least four of said substantially straight wall portions, as viewed in a cross-section of said honeycomb body, are disposed having substantially equal angles between them at said common node.

7. The honeycomb assembly according to claim 6, wherein said honeycomb body has substantially rotationally symmetrical outside surfaces and an axis of rotation, said plurality of passages passing through said honeycomb body in a substantially parallel relationship to said axis of rotation, and said common node is disposed approximately on said axis of rotation.

8. The honeycomb assembly according to claim 1, wherein said plurality of passages are defined by passage wall surfaces and that a larger portion of said passage wall surfaces in said interior of said honeycomb body is formed by said first passage walls of said first thickness than by said second passage walls of said second thickness, and said first thickness is at least 20% less than said second thickness.

9. The honeycomb assembly according to claim 1, wherein said first thickness is between 20 $\mu$m and 60 $\mu$m.

10. The honeycomb assembly according to claim 9, wherein said first thickness is about 30 $\mu$m.

11. The honeycomb assembly according to claim 1, wherein said plurality of passages are defined by wall portions extending around said honeycomb body in a closed configuration and disposed at different, respectively approximately constant spacings relative to said outside periphery of said honeycomb body so that regions, in a form of ring segments, are formed in a cross-section.

12. The honeycomb assembly according to claim 11, wherein at least a portion of said wall portions which extend around the honeycomb body in said closed configuration have said first thickness.

13. The honeycomb assembly according to claim 11, wherein said plurality of passages are further defined by further passage walls, said further passage walls disposed transversely with respect to said wall portions extending around said honeycomb body in said closed configuration for subdividing said ring segments.

14. The honeycomb assembly according to claim 13, wherein said plurality of passages have cross-sectional areas that are substantially equal in size.

* * * * *

UNITED STATES PATENT AND TRADEMARK OFFICE
CERTIFICATE OF CORRECTION

PATENT NO. : 6,391,421 B1
DATED : May 21, 2002
INVENTOR(S) : Rolf Brück et al.

It is certified that error appears in the above-identified patent and that said Letters Patent is hereby corrected as shown below:

<u>Title page,</u>
Item [30], should read as follows:

-- Foreign Application Priority Data
February 4, 1997 [DE] ......................... 197 04 144 --

Signed and Sealed this

Twenty-fourth Day of September, 2002

Attest:

Attesting Officer

JAMES E. ROGAN
*Director of the United States Patent and Trademark Office*